United States Patent [19]

Moses et al.

[11] Patent Number: 5,612,943
[45] Date of Patent: Mar. 18, 1997

[54] SYSTEM FOR CARRYING TRANSPARENT DIGITAL DATA WITHIN AN AUDIO SIGNAL

[76] Inventors: Robert W. Moses, 6528 26th Ave. NW, Seattle, Wash. 98117; Norman Durkee, The Marlborough House #1003, 1220 Boren Ave., Seattle, Wash. 98101-2712; Charles H. Hustig, 482 Box Cir., Hudson, Wis. 54016

[21] Appl. No.: 270,252

[22] Filed: Jul. 5, 1994

[51] Int. Cl.$^6$ ........................................ G11B 7/00
[52] U.S. Cl. .................. 369/124; 369/48; 369/49; 369/59; 360/29; 360/32
[58] Field of Search .................. 369/124, 47, 48, 369/49, 50, 54, 58, 59; 360/29, 48, 32

[56] References Cited

U.S. PATENT DOCUMENTS

| | | |
|---|---|---|
| 4,382,299 | 5/1983 | Dieterich . |
| 4,587,643 | 5/1986 | Monen et al. . |
| 4,641,295 | 2/1987 | Furukawa et al. . |
| 4,686,509 | 8/1987 | Araki et al. . |
| 4,700,173 | 10/1987 | Araki et al. . |
| 4,731,774 | 3/1988 | Furukawa . |
| 4,752,953 | 6/1988 | Paik et al. . |
| 4,763,207 | 8/1988 | Podolak et al. . |
| 4,851,931 | 7/1989 | Parker et al. . |
| 5,012,352 | 4/1991 | Yoshimura et al. . |
| 5,018,020 | 5/1991 | Dakin . |
| 5,062,007 | 10/1991 | Wakatsu et al. ............... 360/29 |
| 5,101,274 | 3/1992 | Yoshimura et al. . |
| 5,105,314 | 4/1992 | Ro . |
| 5,400,315 | 3/1995 | Koishi et al. ............... 369/124 |

*Primary Examiner*—Muhammad N. Edun
*Attorney, Agent, or Firm*—Haynes and Boone, L.L.P.

[57] ABSTRACT

A signal processing system comprises inputs for an analog audio signal and a digital data signal. The digital data signal is modulated to an analog data signal in an inaudible frequency band. Filters are used to ensure that the audio signal is restricted to audible frequencies and that the analog data signal is restricted to inaudible frequencies. The two analog signals are then combined into a composite analog signal. The composite signal is stored on a medium such as a compact disc. Filters are used to extract and separate the two analog signals from the composite signal stored on the medium. The analog data signal is demodulated to retrieve the original digital data signal.

10 Claims, 6 Drawing Sheets

SYSTEM FOR CARRYING TRANSPARENT DIGITAL DATA WITHIN AN AUDIO SIGNAL

TECHNICAL FIELD

This invention relates generally to a signal processing system, and more particularly to a signal processing system for transparently transporting a digital signal in an audio signal.

BACKGROUND OF THE INVENTION

Signals may be represented mathematically as functions of time and, more particularly as either analog (continuous-time) signals or digital (discrete-time) signals. As used herein, analog signals are defined for a continuum of time values and may be represented, for example, by a continuously time-varying electrical voltage. Digital signals, in contrast, are defined only at discrete points in time and may, for example, be represented by a series of electrical voltage pulses. Each represents a bit (i.e., a 0 or a 1), and accordingly, the series of pulses or bits is described as a bitstream, or a series of 0's and 1's. The bitstream may represent data or it may represent, numerically, the strength or amplitude, of a continuous signal at discrete points in time.

It is useful in many applications to combine analog and digital signals into a single composite signal. Furthermore, there is a particular need in numerous applications to combine an analog signal representing audio, with a digital signal representing data. For example, a compact disc (CD) or magnetic tape may be used to store music (analog audio) simultaneously with a standardized protocol (digital data) to control other equipment (e.g., audio processors, lights) in a home entertainment system or a live performance system. Similarly, a CD player or magnetic tape may interface with a computer to control synchronously, using digital data, events in a computer game while generating audio sounds. Other examples include the display of text (e.g., lyrics, using digital data) with music, the combination of speech and text for educational purposes (e.g., language or reading instruction) or entertainment (e.g., "talking books"), the compression of musical instrument digital interface (MIDI) data with recorded audio, the synchronous control of lights with music using simple lighting control protocols, the synchronization of music with computer-controlled water fountains using a simple control protocol, the control of slides and other audio-visual equipment during a prerecorded presentation, and the transmission of data over analog audio broadcast links. Several techniques have been developed to address the need for combining analog audio signals and digital data signals. One such technique requires that the analog audio signal be converted to a digital audio signal and then combined with the digital data signal (by interleaving digital data bits) to form a single digital composite signal. This is exemplified by Furukawa in U.S. Pat. No. 4,731,774, which discloses a technique for inserting digital data into the digital subcode bits of a CD digital audio bitstream. A disadvantage of Furukawa's technique is that, to retrieve the embedded data, a special CD player having a digital output such as the Sony Philips Digital Interface ("SPDIF") digital output must be used. Furthermore, special hardware must then be used to extract the data from the SPDIF signal. Compared to analog-only systems, such techniques are complicated and expensive to implement.

Alternatively, analog audio signals and digital data signals may be combined by first converting the digital data signal to an analog data signal and then combining it with the analog audio signal to form a single analog composite signal. This has been done on an elementary scale with slide projectors in which an audible tone, for advancing slides, is incorporated into an associated recorded narrative. Two disadvantages of this technique are that the data signal is audible and the data transfer rate is too limited for many of the applications described above.

Another technique that may be used to form a single composite analog signal, developed by a co-inventor of the present invention and disclosed in U.S. Pat. No. 4,672,605, is to use a spread spectrum "data-over-voice" system in which alarm messages and other data are transmitted over telephone wires simultaneously with voice conversations. As in the technique described above for controlling a slide projector, the data signal in the spread spectrum system is audible, and is limited to extremely low data rates.

For the foregoing reasons, there is a need for a cost-effective signal processing system that can record and retrieve, inaudibly and at flexible transfer rates, digital data within an analog audio signal.

SUMMARY OF THE INVENTION

The foregoing problems are solved and a technical advance is achieved by an economical signal processing system that can transparently record and retrieve, inaudibly and at flexible transfer rates, digital data within an analog audio signal. In a departure from the art, in an encoding portion of the signal processing system, a digital data signal is converted (modulated) to an analog data signal at an inaudible frequency band. The analog data signal is then combined with the analog audio signal to form a single composite analog signal. In a decoding portion of the signal processing system, filters are used to retrieve and separate the audio signal and the analog data signal from the composite signal. The analog data signal is then demodulated to a digital data signal. The digital data signal and the analog audio signal are then supplied to appropriate processing equipment via digital and analog outputs respectively.

In an illustrative embodiment of the invention, an encoding portion of the system, which portion combines a first analog (audio) signal and a digital signal, comprises a modulator for modulating a digital signal to a second analog signal. The first and second analog signals are filtered and then summed to form a single composite analog signal, which composite analog signal may then be recorded onto a standard analog recording medium, or digitized and recorded onto a digital recording medium.

In a decoding portion of the system, the composite signal is retrieved from the recording medium by a playback device. Filters are used to extract the first and second analog signals from the composite signal. The second analog signal is then demodulated to the original digital signal.

An advantage achieved with the invention is that the digital signal may be modulated onto a frequency band which is inaudible to the human ear.

A further advantage achieved with the invention is that, because the composite signal is analog and fits with-in the audio bandwidth, it may be recorded and played back using techniques commonly used with audio signals.

A further advantage achieved with the invention is that the format of the data is arbitrary, allowing open-ended systems to carry multiple data types.

A further advantage achieved with the invention is that the data transfer rate is flexible. The portion of the audio bandwidth allocated for the transmission of data, as well as the modulation scheme utilized, may be adjusted to support a number of different data rates and audio bandwidths. The available bandwidth may, therefore, be optimized for a number of different applications.

Another advantage achieved is that the system is economical because specialized technology, such as SPDIF, is not required, and simple technology, such as FSK, may be utilized to modulate digital signals.

DETAILED DESCRIPTION OF A PREFERRED EMBODIMENT

Figure 1:
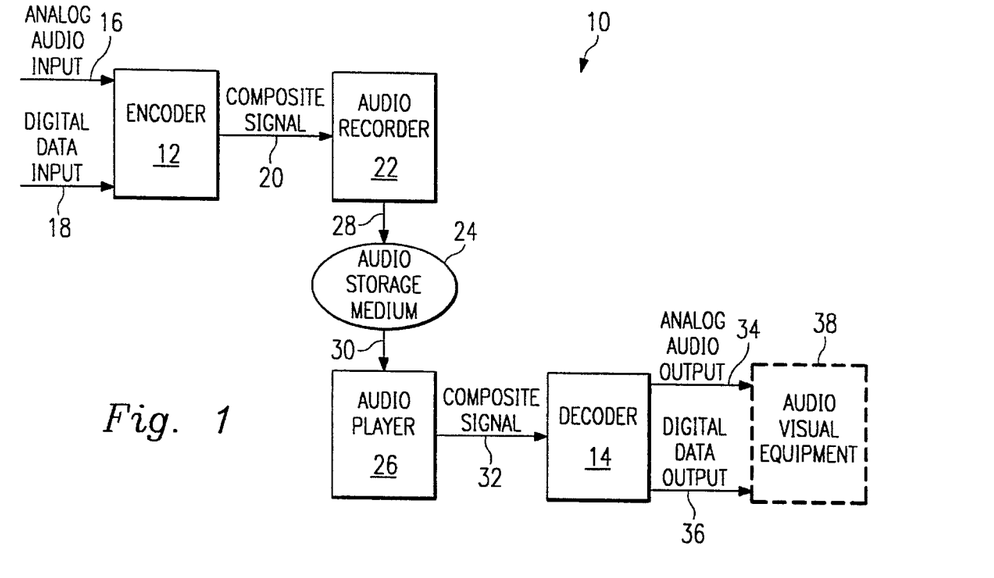
FIG. 1 is a functional block diagram of a preferred embodiment of a signal processing system embodying features of the present invention.

In FIG. 1, the reference numeral 10 designates a signal processing system of the present invention which is utilized for transparently recording and retrieving, inaudibly and at flexible transfer rates, digital data within an analog audio signal. The system 10 includes an encoder 12 and a decoder 14. An analog, audio signal on line 16 and a digital data signal on line 18 are input to the encoder 12 and combined therein to produce a composite analog audio signal in which the data portion thereof is inaudible to the human ear. The composite signal is output from the encoder 12, as represented by line 20, to an audio recorder 22. The audio recorder 22 records the composite signal onto a standard audio storage medium 24 which is used to store the signal and subsequently play it back to the audio player 26, as represented by lines 28 and 30, respectively. The composite signal is output from the audio player 26, as represented by line 32, to the decoder 14. The decoder 14 separates the composite signal into its original analog audio and digital data components. Lines 34 and 36 output from the decoder analog audio and digital data signals, respectively.

In a preferred embodiment, audiovisual equipment 38 is connected by the lines 34, 36 to the system 10 and the system is utilized to control equipment in the delivery of a multimedia presentation. For example, the analog signal input on line 16 to the system 10 may be a radio or television broadcast signal, video, music, speech or any other signal in the form of analog information. The digital data input on line 18 may include ASCII encoded text or other messaging protocol information for use in queuing the equipment 38 for selected functions at selected time intervals of the multimedia presentation of the analog information. In particular, and as will be subsequently described, the equipment 38 includes glasses (FIG. 6) to be worn by the user for producing visual effects during the playback of audio information from the medium 22. In an exemplary application, the medium 22 comprises a compact disk (CD) which has been recorded using the system 10 so that it includes both audio information and inaudible data information. Upon playback, the audio information is heard by the user and the digital information is used to queue the equipment 38 to provide visual effects (through the glasses, FIG. 6) to the user corresponding to the audible information. Applications other than the foregoing are contemplated and are also described more fully below.

Figure 2:
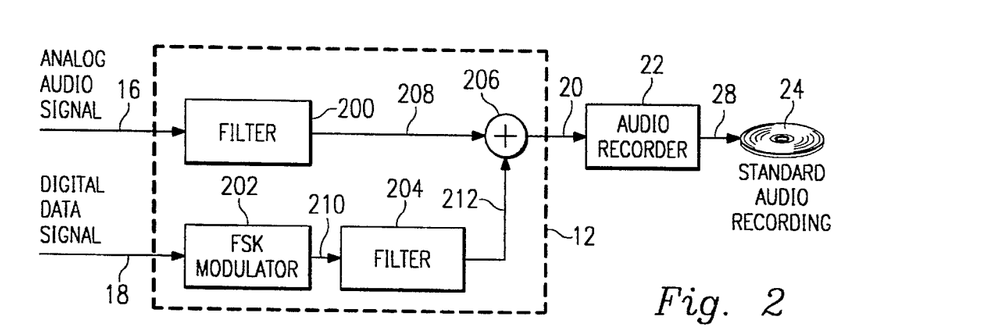
FIG. 2 is a functional block diagram of an encoding portion of the signal processing system of FIG. 1.

FIG. 2 illustrates components of the encoder 12. The encoder 12 comprises a frequency selective filter 200, a frequency shift keying (FSK) modulator 202, a frequency selective filter 204, and a summer 206. The filter 200, exemplified by a low pass filter or a notch filter, receives the analog audio signal on the line 16 and substantially attenuates portions of the signal having frequencies above a −3 dB cutoff frequency of 18 kHz. The filtered signal is output on a line 208 to the summer 206.

The modulator 202 receives the digital data signal on the line 18 and modulates the data signal to an analog data signal having carrier frequencies substantially between 18 kHz and 20 kHz, such as 18.5 kHz and 19.5 kHz for representing a binary 0 and 1 respectively. The modulated data signal is output on a line 210 to the filter 204, which filter is exemplified by a high pass filter or a band pass filter. The filter 204 substantially attenuates portions of the signal having frequencies below 18 kHz, and has a stopband with at least 20 dB of rejection. The filtered data signal from the filter 204 is output onto a line 212 to the summer 206.

The summer 206 combines, or "sums," the audio signal on the line 208 and the data signal on the line 212 to form a single composite analog signal, which is output on a line 20. The composite signal on the line 20 thus comprises two components: a first component defined by the audio signal substantially below 18 kHz, and a second component defined by the modulated data kHz and 20 kHz.

The composite signal on the line 20 generated by the summer 206 is input to the audio recorder 22 which records the composite signal onto the standard audio storage medium 24, such as a compact disc (CD) or magnetic tape via a line 28.

Figure 3:
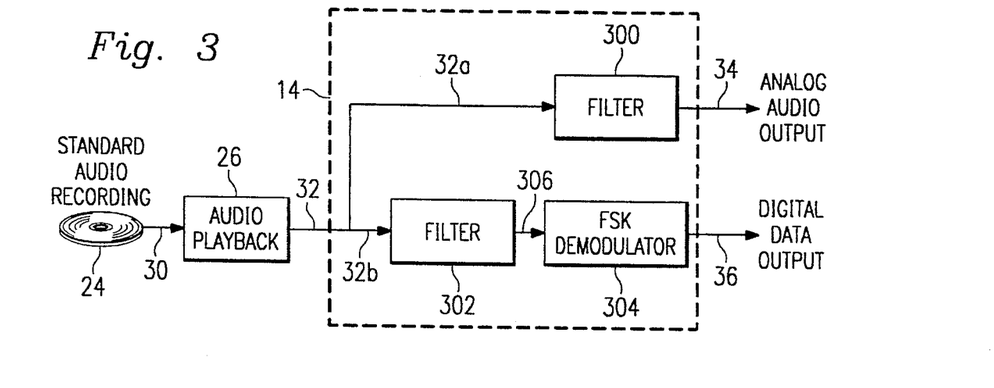
FIG. 3 is a functional block diagram of a decoding portion of the signal processing system of FIG. 1.

FIGS. 3 illustrates components of the decoder 14. The decoder 14 comprises frequency selective filters 300 and 302 and an FSK demodulator 304. The audio player 26 retrieves the composite signal recorded on the standard audio storage medium 24 and outputs it to the filters 300, 302 via lines 32a and 32b, respectively.

The filter 300, exemplified by a low pass filter, outputs onto the line 34 substantially only portions of the composite signal having frequencies below a −3 dB cutoff frequency of 18 kHz. The filtered signal on the line 34, which is substantially similar to the bandlimited audio signal on the line 208 (FIG. 2), may be output to audio processing equipment, such as an amplifier and loudspeakers (not shown).

The filter 302 outputs on a line 306 substantially only portions of the composite signal having frequencies above 18 kHz and, preferably, below 20 kHz, with at least 20 dB of rejection in the stopband. The filtered signal on the line 306 is input to the FSK demodulator 304, which outputs a digital data signal on a line 36 substantially similar to the data signal received on the line 18 (FIGS. 1, 2). The data signal on the line 36 is output to digital processing equipment.

Figure 4:
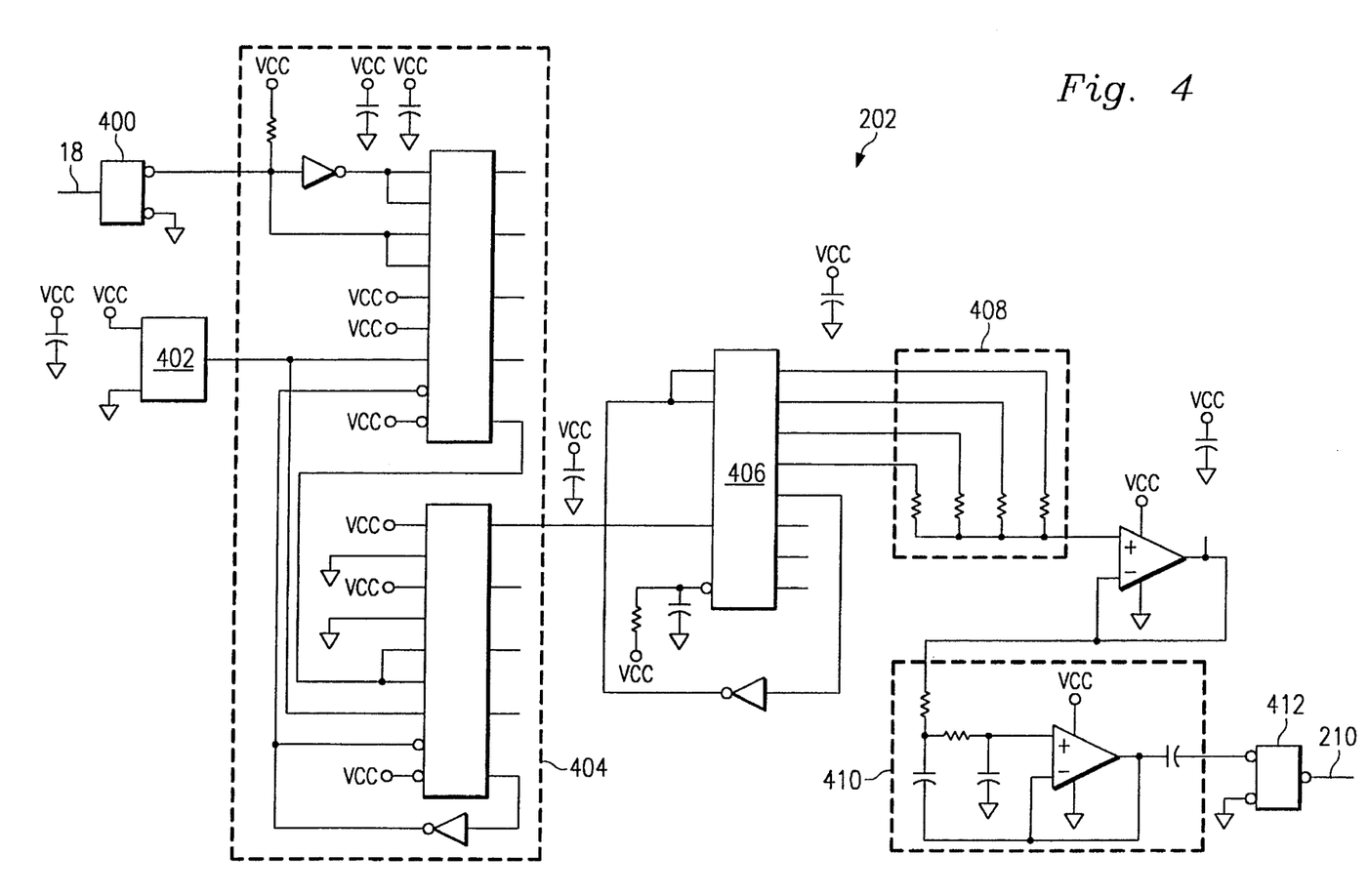
FIG. 4 is a schematic drawing of an analog frequency shift keying modulator circuit of FIG. 2.
Figure 5:
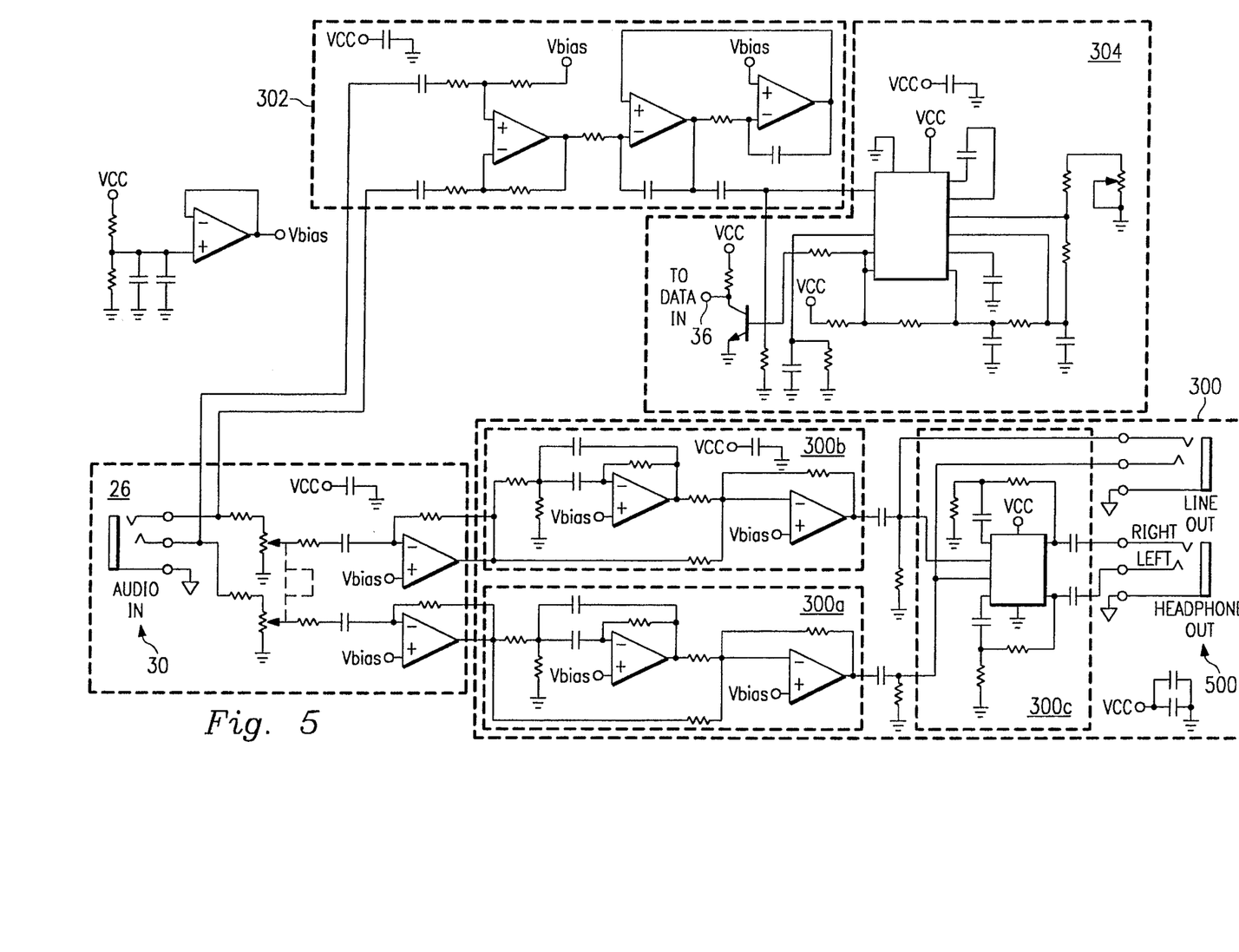
FIG. 5 is a schematic drawing of the circuits of FIG. 3.
Figure 6:
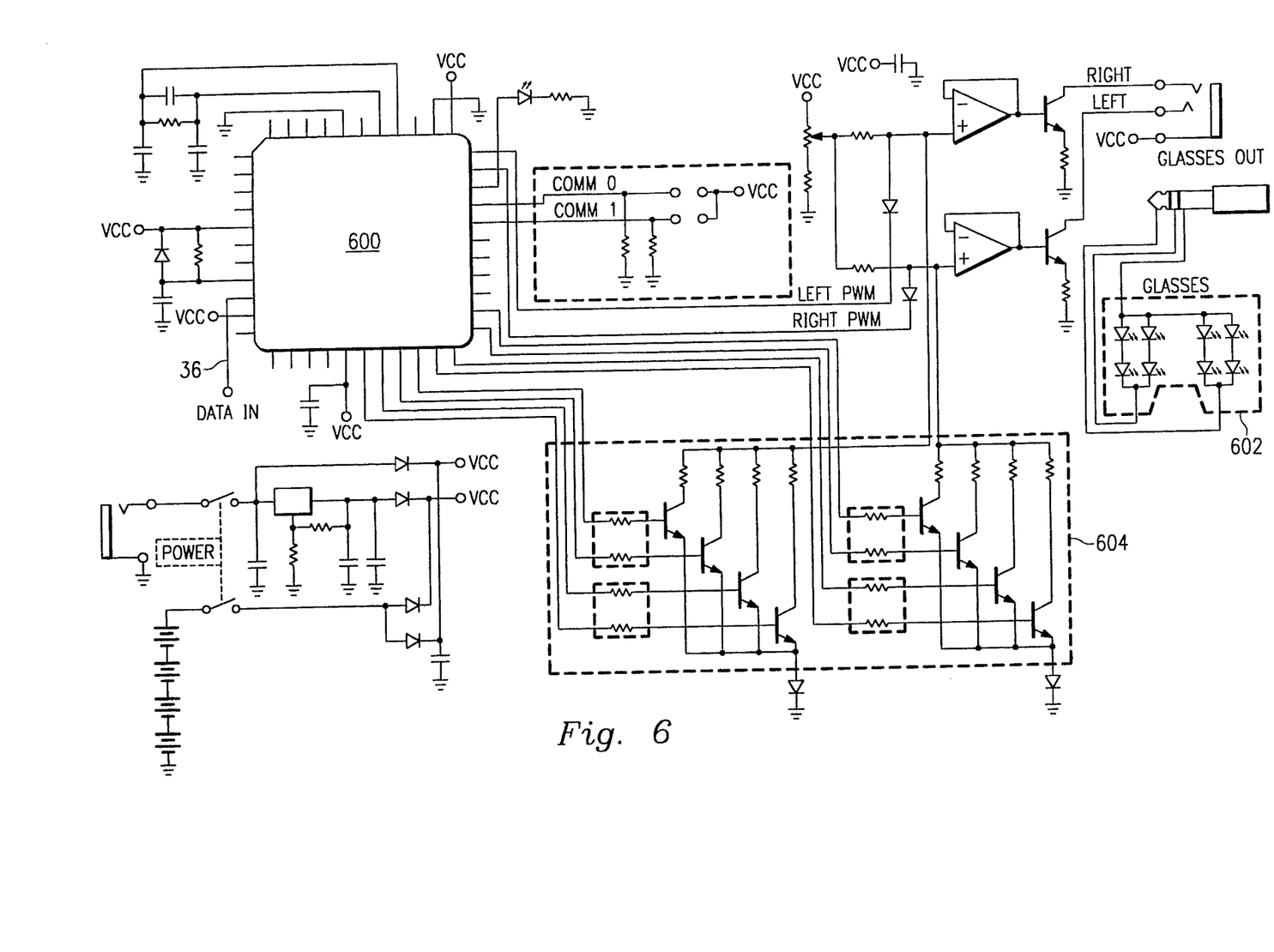
FIG. 6 is a schematic drawing of processing equipment circuitry that may be connected to the digital data output of the decoder of FIGS. 3 and 5.

The circuitry set forth in FIGS. 4–6 illustrate in greater detail a presently preferred implementation of a signal processing system in accordance with the present invention. In the accompanying drawings, part numbers and values of components are set forth, which parts and components are commercially available the present time from commercial vendors.

FIG. 4 illustrates in greater detail the FSK modulator circuitry 202 of the encoder portion 12 of the present invention. The circuitry 202 comprises an input connector 400, a 32 MHz oscillator 402, a divider network 404, a four-bit binary counter 406, a resister array 408, a low pass filter 410, and an output connector 412. The connector 400 receives data bits from the line 18 at, for example, 1200 baud, and outputs the bits serially to the divider network 404. The divider network 404 receives a 32 MHz signal from the oscillator 402 and outputs to the counter 406 either a 296 (16×18.5) or a 312 (16×19.5) kHz clock signal, depending on whether the last bit received from the connector 400 was a 0 or a 1, respectively. The counter 406 outputs four signals on four lines to the resister array 408 for each clock cycle that it receives from the network 404. The output from the array 408 then traces, as a function of time, a 16 step sine wave at a rate of 18.5 or 19.5 kHz, the rate depending on whether the last bit received from the connector 400 was a 0 or a 1, respectively. The stepped sine wave output from the array 408 is then passed through the filter 410 which "smooths" the waveform, the waveform representing the modulated data input to the connector 400, and then outputs the smoothed waveform onto the line 210 via the connector 412.

FIG. 5 depicts in greater detail the decoder portion 14 of the present invention comprising the input line 30, the audio player circuitry 26, the low pass filter circuitry 300, high pass filter circuitry 302, the FSK demodulator circuitry 304, and the output line 36. The filter 300 includes two channels for processing stereo as depicted by low pass filters 158a, 158b, headphone stereo amplifier 158c, and headphone output 500.

FIG. 6 depicts a schematic of digital processing circuitry that may be connected to receive the digital data signal output on the line 36 (FIGS. 3, 5). Included in FIG. 6 is a microprocessor 600 and image glasses 602, which glasses have eight light emitting diodes (LED's) that are illuminated at various intensities in response to the digital data signal received on the line 36. The intensity of the LED's is controlled by an array 602 of transistors and resisters which are controlled by the microprocessor 600. By controlling the audio and the intensity of the lights, a number of various effects may be created. For example, people could be entertained or healed, virtual reality could be effected, learning could be stimulated by enhancing a person's concentration, or drug addicts could be aided in recovery by being able to electronically simulate and control hallucinations.

In an alternative embodiment of the present invention, the internal processing of the encoder 10 is performed using digital signal processing (DSP) technology. The functional blocks shown in FIG. 2 relating to the previous embodiment are the same except that an analog to digital converter (ADC, not shown) is employed to digitize the analog audio input signal before it is applied to the line 14. The filters 200, 202, the FSK modulator 202, and the summer 206 of the preferred embodiment are contained on a single DSP microprocessor chip (not shown). Because the operation of the individual components described herein is understood by those skilled in the art based on this disclosure, such operation will only be briefly discussed here.

Figure 7:
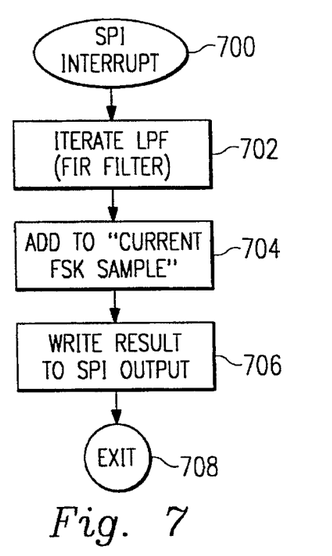
FIGS. 7–9 are a flowcharts illustrating respective SPI, SSI, and timer interrupt processes utilized in an alternate embodiment of FIG. 2.

FIG. 7 is a flow chart illustrating a serial peripheral interface (SPI) interrupt service routine which performs the functions of the filter 200 and summer 206 in a DSP embodiment. Typically, 44,100 samples of the digitized analog audio signal are input from the above-mentioned ADC onto the line 14 every second, each sample of which typically comprises 16 bits. In step 700, an interrupt is generated for each new sample that is input. In step 702, the low pass filter (typically a FIR—finite impulse response—filter)is then iterated. Each iteration includes shifting, in a first in, first out (FIFO) manner, previous samples stored in the filter so that the new sample can be stored, multiplying every sample by a coefficient, and then summing the results of all the multiplications to form an output sample. Execution then proceeds to step 704, in which the output sample is output to the summer 206—a binary adder—which adds the output sample to a "current FSK sample" (which FSK sample will be described with reference to FIGS. 8 and 9) stored in a memory (not shown), forming thereby a summed result. Execution then proceeds to step 706, and the summed result is output to the audio recorder 22 via the line 20 and the storage medium 24 via the line 28. If the audio recorder 36 or the audio storage medium 40 is analog, then an appropriate digital to analog converter (DAC) would be necessary.

Figure 8:
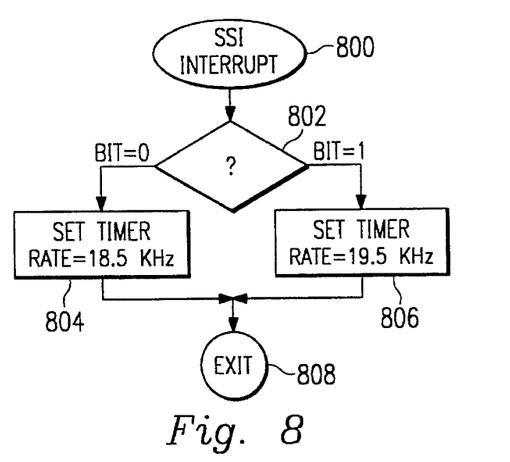
Figure 9:
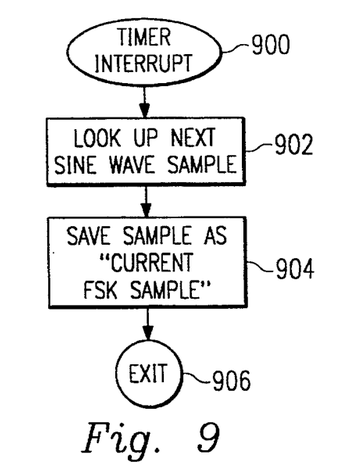

FIGS. 8 and 9 are flow charts illustrating, respectively, synchronous serial interface (SSI) and timer interrupt service routines which generate an FSK signal simultaneously while the SPI interrupt service routine is processing audio input. When a digital data bit is input on the line 18, an SSI interrupt is generated in step 800. Execution then proceeds to step 802 where a determination is made to set the timer either to 18.5 kHz in step 804 if the bit on the line 18 equals zero, or to 19.5 kHz in step 806 if the bit equals one. A timer (not shown) then counts a number of clock cycles until it "times out," which number is a function of the timer rate most recently set in step 804 or 806 (FIG. 8). When the timer times out, an interrupt is generated in step 900. Execution then proceeds to step 902 in which a "look-up" table having sine wave samples is looked up (referenced). In step 904, the next sine wave sample looked up becomes the "current FSK sample" and is copied to the memory address accessed in step 704. Thus, either an 18.5 or a 19.5 kHz carrier frequency, and thus FSK modulation, is generated from the data bits input on the line 18. The carrier frequency generated is filtered using an FIR filter analogous to the filter.

Figure 10A:
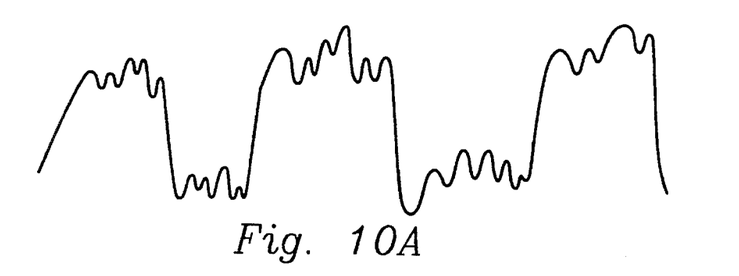
FIG. 10A is a waveform of an exemplary analog audio signal input to the encoder of FIG. 2.
Figure 10B:
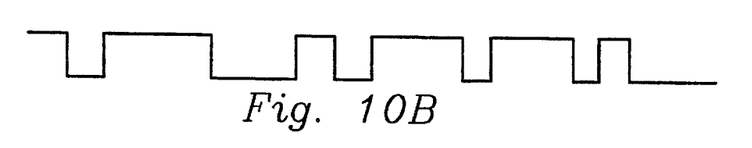
FIG. 10B is a waveform of an exemplary digital data signal input to the encoder of FIG. 2.
Figure 10C:
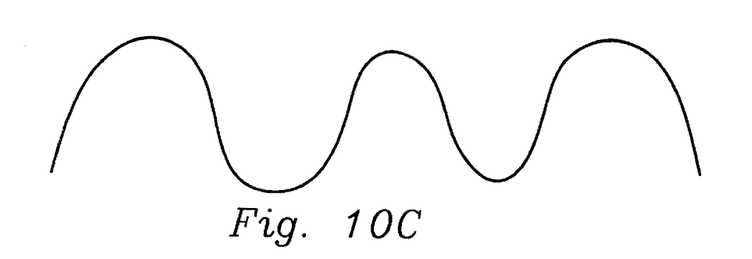
FIG. 10C is a waveform of the analog audio signal of FIG. 10A after being filtered by the encoder of FIG. 2.
Figure 10D:
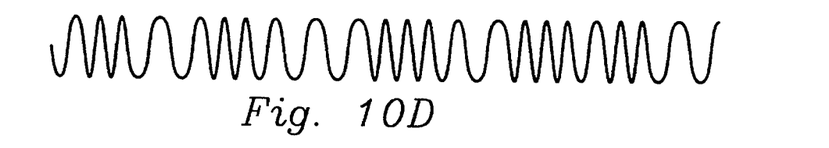
FIG. 10D is a waveform of the digital data signal of FIG. 10B after it is modulated by the encoder of FIG. 2.
Figure 10E:
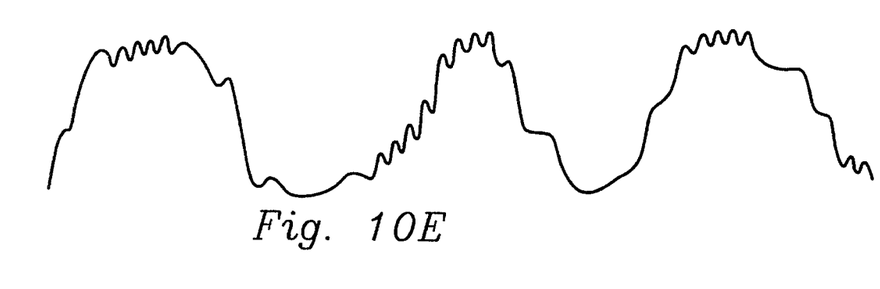
FIG. 10E is a composite analog signal waveform in which the signal waveforms of FIGS. 10C and 10D are combined.

FIGS. 10A–10E illustrate waveforms of typical signals output onto various lines in the present invention as described herein. Specifically, FIG. 10A depicts the waveform of an analog audio signal input onto the line 16. FIG. 10B depicts the waveform of a digital data signal input onto the line 18, and output onto the line 36. FIG. 10C depicts the waveform of the analog audio signal of FIG. 10A after being filtered by the filters 200 and 300 and output onto the lines 208 and 34 respectively. FIG. 10D depicts the waveform of the digital data signal of FIG. 10B after being modulated by the modulator 202 and output onto the line 210, and after being filtered by the filter 302 and output onto the line 306.

FIG. 10D depicts the waveform of a composite analog signal in which the signal waveforms of FIGS. 10C and 10D are combined by the summer 206 and output onto the line 20.

The embodiments of the present invention as described herein have many advantages over the prior art, including the ability to incorporate, within an audio signal, an inaudible data signal, forming thereby a single composite analog signal. A further advantage achieved is that, because the composite signal is analog, it may be recorded using techniques commonly used with audio signals. Another advantage achieved is that the format of the data is arbitrary, allowing open-ended systems to carry multiple data types for "multimedia" systems. Furthermore, the data transfer rate is flexible and may be adjusted by utilizing different modulation schemes and/or adjusting the portion of the audio bandwidth allocated for the transmission of data. Another advantage achieved is that the system is economical because specialized technology, such as SPDIF, is not required, and simple technology, such as FSK, may be utilized to modulate digital signals. A further advantage is achieved by employing DSP in the encoder 10 to greatly increase the effectiveness of the filters 16 and 30.

It is understood that the present invention can take many forms and embodiments. The embodiments shown herein are intended to illustrate rather than to limit the invention, it being appreciated that variations may be made without departing from the spirit or the scope of the invention. For example, any or all of the filters 16, 30, 58, 64 could be removed altogether for greater economy, albeit very low quality audio and data transmission.

In still further embodiments, the analog signal may represent a video or image signal instead of, or in addition to, an audio signal. Filter bandwidths may also vary accordingly for different applications. Other modulation techniques, such as Phase Shift Keying (PSK) or Quadrature Phase Shift Keying (QPSK) techniques, while more expensive and complex than FSK techniques, may be used by the modulator 202 and the demodulator 304 to improve the data transfer rate for a given bandwidth. The medium 24 may be a number of different types of analog or digital media, such as CD's, LP records, magnetic tape, or any other means of recording or broadcasting analog signals.

In still further embodiments, the storage medium 24 may be used to store music (analog audio) simultaneously with a standardized protocol (digital data) to control other equipment (e.g., audio processors, lights) in a home entertainment system or a live performance system. Similarly, the medium may interface with a computer to control synchronously, using digital data, events in a computer game while generating audio sounds. Other embodiments include the display of text (e.g., lyrics, using digital data) with music, the combination of speech and text for educational purposes (e.g., language or reading instruction) or entertainment (e.g., "talking books"), the compression of musical instrument digital interface (MIDI) data with recorded audio, the synchronous control of lights with music using simple lighting control protocols, the synchronization of music with computer-controlled water fountains using a simple control protocol, the control of slides and other audio-visual equipment during a prerecorded presentation, the transmission of data analog audio broadcast links, and the simulation of physical tremors from such events as earthquakes during video presentations of such.

Although illustrative embodiments of the invention have been shown and described, a wide range of modification, change, and substitution is intended in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A system for combining an unmodulated first analog signal and a digital signal, said system comprising:

means for modulating said digital signal to a second analog signal different from said first analog signal;

a first filter for attenuating, in a first frequency band, the amplitude of said second analog signal;

a second filter for attenuating, in a second frequency band, the amplitude of said first analog signal, said first and second bands being nonoverlapping;

means for combining said first and second filtered analog signals to form a single composite analog signal, a third filter for attenuating, in said second frequency band, the amplitude of said composite signal to extract said first analog signal;

a fourth filter for attenuating, in said first frequency band, the amplitude of said composite signal to extract said second analog signal;

means for demodulating said second analog signal to said digital signal; and wherein:

said first band consists of frequencies below a −3 dB cutoff frequency, said second band consists of frequencies above said cutoff frequency, said first signal consists essentially of frequencies contained within said first band, and said second signal consists essentially of frequencies contained within said second band.

2. The system of claim 1, wherein said cutoff frequency is 18 kHz.

3. A system for combining an unmodulated first analog signal and a digital signal, said system comprising:

means for modulating said digital signal to a second analog signal different from said first analog signal;

a first filter for attenuating, in a first frequency band, the amplitude of said second analog signal;

a second filter for attenuating, in a second frequency band, the amplitude of said first analog signal, said first and second bands being nonoverlapping;

means for combining said first and second filtered analog signals to form a single composite analog signal, a third filter for attenuating, in said second frequency band, the amplitude of said composite signal to extract said first analog signal;

a fourth filter for attenuating, in said first frequency band, the amplitude of said composite signal to extract said second analog signal; and means for demodulating said second analog signal to said digital signal; and wherein said modulator and said demodulator utilize phase shift keying technology.

4. A System for combining an unmodulated first analog signal and a digital signal, said system comprising:

means for modulating said digital signal to a second analog signal different from said first analog signal;

a first filter for attenuating in a first frequency band, the amplitude of said second analog signal;

a second filter for attenuating, in a second frequency band, the amplitude of said first analog signal, said first and second bands being nonoverlapping;

means for combining said first and second filtered analog signals to form a single composite analog signal, a third filter for attenuating, in said second frequency band, the amplitude of said composite signal to extract said first analog signal;

a fourth filter for attenuating, in said first frequency band, the amplitude of said composite signal to extract said second analog signal; and means for demodulating said second analog signal to said digital signal; and wherein said modulator and said demodulator utilize quadrature phase shift keying technology.

5. A system for combining an unmodulated first analog signal and a digital signal, said system comprising:

means for modulating said digital signal to a second analog signal different from said first analog signal;

a first filter for attenuating, in a first frequency band, the amplitude of said second analog signal;

a second filter for attenuating, in a second frequency band, the amplitude of said first analog signal, said first and second bands being nonoverlapping;

means for combining said first and second filtered analog signals to form a single composite analog signal, a third filter for attenuating, in said second frequency band, the amplitude of said composite signal to extract said first analog signal;

a fourth filter for attenuating, in said first frequency band, the amplitude of said composite signal to extract said second analog signal; and means for demodulating said second analog signal to said digital signal; and wherein said modulator and said demodulator utilize frequency shift keying technology.

6. A method for combining an unmodulated first analog signal and a digital signal, said process comprising:

modulating said digital signal to a second analog signal different from said first analog signal;

attenuating, in a first frequency band, the amplitude of said second analog signal;

attenuating, in a second frequency band, the amplitude of said first analog signal, said first and second bands being nonoverlapping;

combining said first and second analog signals to form a single composite analog signal;

attenuating, in said second frequency band, the amplitude of said composite signal to extract said first analog signal;

attenuating, in said first frequency band, the amplitude of said composite signal to extract said second analog signal;

demodulating said second analog signal to said digital signal; and wherein:

said first band consists of frequencies below a −3 dB cutoff frequency, said second band consists of frequencies above said cutoff frequency, said first signal consists essentially of frequencies contained within said first band, and said second signal consists essentially of frequencies contained within said second band.

7. The method of claim 6, wherein said cutoff frequency is 18 kHz.

8. A method for combining an unmodulated first analog signal and a digital signal, said process comprising:

modulating said digital signal to a second analog signal different from said first analog signal;

attenuating, in a first frequency band, the amplitude of said second analog signal;

attenuating, in a second frequency band, the amplitude of said first analog signals, said first and second bands being nonoverlapping;

combining said first and second analog signals to form a single composite analog signal;

attenuating, in said second frequency bands, the amplitude of said composite signal to extract said first analog signal;

attenuating, in said first frequency bands, the amplitude of said composite signal to extract said second analog signal;

demodulating said second analog signal to said digital signal; and wherein the steps of modulating said digital signal, and of demodulating said second analog signal are performed utilizing phase shift keying technology.

9. A method for combining an unmodulated first analog signal and a digital signal, said process comprising:

modulating said digital signal to a second analog signal different from said first analog signal;

attenuating, in a first frequency band, the amplitude of said second analog signal;

attenuating, in a second frequency band, the amplitude of said first analog signal, said first and second bands being nonoverlapping;

combining said first and second analog signals to form a single composite analog signal;

attenuating, in said second frequency band, the amplitude of said composite signal to extract said first analog signal;

attenuating, in said first frequency band, the amplitude of said composite signal to extract said second analog signal;

demodulating said second analog signal to said digital signal; and wherein the steps of modulating said digital signal, and of demodulating said second analog signal are performed utilizing quadrature phase shift keying technology.

10. A method for combining an unmodulated first analog signal and a digital signal, said process comprising:

modulating said digital signal to a second analog signal different from said first analog signal;

attenuating, in a first frequency band, the amplitude of said second analog signal:

attenuating, in a second frequency band, the amplitude of said first analog signal, said first and second bands being nonoverlapping:

combining said first and second analog signals to form a single composite analog signal;

attenuating, in said second frequency band, the amplitude of said composite signal to extract said first analog signal;

attenuating, in said first frequency band, the amplitude of said composite signal to extract said second analog signal;

demodulating said second analog signal to said digital signal; and wherein the steps of modulating said digital signal, and of demodulating said second analog signal are performed utilizing frequency shift keying technology.

* * * * *

UNITED STATES PATENT AND TRADEMARK OFFICE
CERTIFICATE OF CORRECTION

PATENT NO. : 5,612,943
DATED : March 18, 1997
INVENTOR(s) : Robert W. Moses et al.

It is certified that error appears in the above-identified patent and that said Letters Patent is hereby corrected as shown below:

Column 1, line 20, "Each represents" should be --Each pulse represents--.
Column 1, line 49, "Several techniques" should be the beginning of a new paragraph.

Column 4, line 46, "data kHz" should be --data signal between 18 kHz--.
Column 5, line 44, "stereo as" should be --stereo audio as--.

Signed and Sealed this

Eleventh Day of November, 1997

Attest:

BRUCE LEHMAN

Attesting Officer    Commissioner of Patents and Trademarks